(12) United States Patent
Lee et al.

(10) Patent No.: US 12,092,528 B2
(45) Date of Patent: Sep. 17, 2024

(54) MONITORS FOR PRESSURIZED SYSTEMS (71) Applicant: Everactive, Inc., Santa Clara, CA (US)

(72) Inventors: Jude Lee, Union City, CA (US);
Gerardo Gonzalez Huerta, San Jose, CA (US)

(73) Assignee: Everactive, Inc., Santa Clara, CA (US)

( * ) Notice: Subject to any disclaimer, the term of this patent is extended or adjusted under 35 U.S.C. 154(b) by 481 days.

(21) Appl. No.: 17/304,549

(22) Filed: Jun. 22, 2021

(65) Prior Publication Data

US 2022/0404211 A1  Dec. 22, 2022

(51) Int. Cl.

| | |
|---|---|
| *G01K 1/20* | (2006.01) |
| *G01K 1/02* | (2021.01) |
| *G01K 1/14* | (2021.01) |
| *G01K 7/00* | (2006.01) |
| *G12B 15/06* | (2006.01) |
| *G01K 1/08* | (2021.01) |
| *G01K 13/02* | (2021.01) |

(52) U.S. Cl.
CPC .............. *G01K 1/20* (2013.01); *G01K 1/026* (2013.01); *G01K 7/00* (2013.01); *G01K 1/08* (2013.01); *G01K 1/14* (2013.01); *G01K 13/02* (2013.01); *G01K 2215/00* (2013.01); *G12B 15/06* (2013.01)

(58) Field of Classification Search
CPC ............ G01K 1/20; G01K 1/026; G01K 7/00; G01K 1/08; G01K 1/14; G01K 13/02; G01K 2215/00; G12B 15/06
See application file for complete search history.

(56) References Cited

U.S. PATENT DOCUMENTS

| | | | | |
|---|---|---|---|---|
| 8,675,332 | B1 * | 3/2014 | Green | F21S 8/026 |
| | | | | 361/103 |
| 9,063,016 | B2 * | 6/2015 | Bohan | G01L 19/0092 |
| 9,816,877 | B2 * | 11/2017 | Blemel | H02H 3/085 |
| 11,474,576 | B1 * | 10/2022 | Boone | G01K 7/01 |
| 2002/0124666 | A1 * | 9/2002 | Navarro | F16T 1/48 |
| | | | | 73/865.8 |
| 2004/0242169 | A1 * | 12/2004 | Albsmeier | G01K 1/14 |
| | | | | 374/E1.004 |
| 2008/0083446 | A1 * | 4/2008 | Chakraborty | H10N 10/13 |
| | | | | 136/205 |
| 2008/0150737 | A1 * | 6/2008 | Karschnia | F22B 37/428 |
| | | | | 340/605 |
| 2009/0184829 | A1 * | 7/2009 | Rivers, Jr. | G01K 3/005 |
| | | | | 340/584 |

(Continued)

FOREIGN PATENT DOCUMENTS

| | | |
|---|---|---|
| CN | 112903131 A | 6/2021 |
| GB | 2497996 A | 7/2013 |

OTHER PUBLICATIONS

International Search Report and Written Opinion dated Oct. 6, 2022, in PCT Application No. PCT/US2022/033361.

(Continued)

*Primary Examiner* — Nathaniel T Woodward
*Assistant Examiner* — Philip L Cotey
(74) *Attorney, Agent, or Firm* — Weaver Austin Villeneuve & Sampson LLP (57) ABSTRACT

Monitors are for pressurized systems are described. These may include batteryless monitors that run on power harvested from their environments.

29 Claims, 9 Drawing Sheets

(56) References Cited

U.S. PATENT DOCUMENTS

| | | | |
|---|---|---|---|
| 2009/0210190 A1* | 8/2009 | Carlson | G01K 3/005 |
| | | | 702/130 |
| 2010/0091816 A1* | 4/2010 | Schroll | G01K 7/04 |
| | | | 374/165 |
| 2011/0150036 A1* | 6/2011 | Lee | H10N 10/17 |
| | | | 136/211 |
| 2012/0221287 A1* | 8/2012 | Ioannidis | G01K 7/00 |
| | | | 702/132 |
| 2016/0084550 A1* | 3/2016 | Fall | B60P 3/20 |
| | | | 62/126 |
| 2016/0097685 A1* | 4/2016 | Blemel | H01H 71/145 |
| | | | 374/57 |
| 2017/0191617 A1* | 7/2017 | Oh | G01M 3/04 |
| 2018/0128688 A1* | 5/2018 | Newell | G05D 11/138 |
| 2019/0094165 A1* | 3/2019 | Lauber | G01K 11/32 |
| 2020/0194650 A1* | 6/2020 | Scobee | G01N 25/18 |
| 2022/0307915 A1* | 9/2022 | Gebhardt | G01K 7/16 |

OTHER PUBLICATIONS

International Preliminary Report on Patentability and Written Opinion dated Jan. 4, 2024 in PCT Application No. PCT/US2022/033361.

* cited by examiner

MONITORS FOR PRESSURIZED SYSTEMS

BACKGROUND

Pressurized systems are used in a wide variety of industrial applications as delivery and/or removal systems for gases and liquids. Pressurized systems may also be used to provide energy. For example, steam systems provide energy via heat transfer, e.g., steam generated by a boiler flows through a distribution system to heat exchangers by which the heat of the steam is transferred to loads. Pressurized systems typically include components designed to improve safety and reliability by reducing pressure and/or removing undesirable byproducts (e.g., condensates in steam systems). Such components include, for example, safety valves, pressure relief valves, rupture discs, steam traps, etc.

While such components are highly effective in preventing catastrophic system failures that can result from over-pressure conditions, it may not be immediately apparent when a given component is operating to relieve system pressure. This can result in reduced system efficiency and difficult troubleshooting. In addition, these components themselves are characterized by failure modes which can prevent them from performing their intended function. However, particularly for large installations, manual inspection and maintenance of these components may not be particularly effective.

Electronic monitors have been developed for monitoring various components of pressurized systems such as, for example, steam traps in steam systems. These include battery-less monitors that harvest energy from their environments using, for example, thermo-electric generators (TEGs) or solar cells. Some industrial facilities may have hundreds or even thousands of such monitors. The manner in which these monitors are placed and mounted in such facilities varies considerably, typically attempting to balance various considerations while achieving the goal of continuous monitoring of system components. For example, if a monitor employs a TEG, it is desirable for the TEG to be mounted on or near a reliable source of consistent heat. Similarly, if a monitor employs a temperature sensor, it is desirable for the temperature sensor to be in close proximity to the heat source being monitored. On the other hand, it is important to protect the electronics of the sensor from that same heat. In another example, some monitors are configured to generate sensor data from multiple locations that may be some distance apart, e.g., conduits on opposite sides of a steam trap. Balancing these various considerations typically results in ungainly wiring extending between sensor-related components in ways that make mounting difficult, sensors less reliable, and/or create hazardous conditions in the industrial facility being monitored.

SUMMARY

According to various implementations, methods, apparatus, devices, systems, and computer program products are provided for monitoring pressurized systems.

According to a particular class of implementations, a sensor system includes a first temperature sensor configured to generate a first sensing signal representing a first temperature of a first system component at a first location. A power source is configured to provide electrical energy. Sensor circuitry is configured to generate sensor data based on the first sensing signal using the electrical energy from the power source. The sensor circuitry being characterized by a thermal rating. The sensor system also includes one or more heat dissipation components a first mounting component. The temperature sensor, the power source, the sensor circuitry, the one or more heat dissipation components, and the first mounting component are combined in a first integrated assembly configured for mounting on the first system component at the first location using the first mounting component. The first integrated assembly is constructed such that a second temperature of the sensor circuitry remains within the thermal rating over an expected range of the first temperature.

According to a particular implementation of this class, the first temperature sensor includes a thermistor, a thermocouple, or a resistance temperature detector (RTD).

According to a particular implementation of this class, the expected range of the first temperature is up to about 200 degrees Centigrade, and the thermal rating of the sensor circuitry is about 80 degrees Centigrade.

According to a particular implementation of this class, the power source is a battery. According to a more specific implementation, the battery is coupled to the first integrated assembly such that the temperature of the battery remains within the thermal rating over an expected range of the first temperature.

According to a particular implementation of this class, the power source is a photovoltaic harvester. According to a more specific implementation, the photovoltaic harvester is coupled to the first integrated assembly such that the temperature of the photovoltaic remains within the thermal rating over an expected range of the first temperature.

According to a particular implementation of this class, the power source is a thermo-electric generator (TEG) configured for converting thermal energy received from the first location to the electrical energy. According to a more specific implementation, the TEG is mounted on a surface of the first mounting component that is configured to promote heat transfer from the first system component to a first side of the TEG. According to a more specific implementation, the one or more heat dissipation components include a heat sink assembly adjacent a second side of the TEG. The heat sink assembly includes a plurality of radiating members extending away from the second side of the TEG. According to a more specific implementation, the first integrated assembly includes a cage secured to the first mounting component and encompassing the TEG and the heat sink assembly. The cage is configured to provide mechanical protection for the TEG and the heat sink assembly, promote air flow to the heat sink assembly, and inhibit heat transfer to the sensor circuitry. According to a more specific implementation, a spring assembly is secured to the cage and configured to exert force on the TEG such that the first side of the TEG is forced against the surface of the first mounting component.

According to a particular implementation of this class in which the power source is a TEG, the first temperature sensor includes a temperature sensing element within a probe tip. The probe tip is configured for engaging with the first system component at the first location, and the sensor system includes one or more thermal isolation components configured to thermally isolate the probe tip from the TEG and from the first mounting component. According to a more specific implementation, a spring is configured to exert force on the probe tip toward the first system component. According to a more specific implementation, the one or more thermal isolation components include a sleeve in which at least a portion of the spring resides. According to a more specific implementation, the sleeve comprises a polyether ether ketone (PEEK) material.

According to a particular implementation of this class in which the power source is a TEG, the probe tip includes a first portion having a first width, and a second portion having a second width larger than the first width. The second portion of the probe tip has an external surface configured to engage the first system component. According to a more specific implementation, the temperature sensing element is secured to an internal surface of the second portion of the probe tip, and the internal surface is opposite and in thermal communication with the external surface.

According to a particular implementation of this class, the sensor system is a steam trap monitor, and the first system component corresponds to a steam-side conduit connected to a steam trap.

According to a particular implementation of this class, the first mounting component comprises nickel-coated aluminum.

According to a particular implementation of this class, a second integrated assembly is configured for mounting on a second system component using a second mounting component at a second location that is different from the first location. According to a more specific implementation, a conformable, semi-rigid cable is configured for connecting the second integrated assembly to the first integrated assembly. According to another specific implementation, the second integrated assembly includes a second temperature sensor configured to generate a second sensing signal representing a second temperature of the second system component, and the sensor circuitry is also configured to generate the sensor data based on the second sensing signal. According to a more specific implementation, the second temperature sensor includes a temperature sensing element within a probe tip. The probe tip is configured for engaging with the second system component at the second location. One or more thermal isolation components are configured to thermally isolate the probe tip from the second mounting component. According to a more specific implementation, a spring is configured to exert force on the probe tip toward the second system component. According to a more specific implementation, the one or more thermal isolation components include a sleeve in which at least a portion of the spring resides. According to a more specific implementation, the sleeve comprises a polyether ether ketone (PEEK) material. According to another specific implementation, the probe tip includes a first portion having a first width, and a second portion having a second width larger than the first width. The second portion of the probe tip has an external surface configured to engage the second system component. According to a more specific implementation, the temperature sensing element is secured to an internal surface of the second portion of the probe tip, and the internal surface is opposite and in thermal communication with the external surface. According to another specific implementation, the second temperature sensor includes a thermistor, a thermocouple, or a resistance temperature detector (RTD).

According to another class of implementations, a probe tip includes a first portion configured for connection to a sensing assembly. The first portion has a first width in a direction normal to a central axis of the probe tip. The first portion also has a first internal cavity that includes at least a portion of the central axis of the probe tip. A second portion is connected to the first portion. The second portion has a second width in a direction normal to the central axis of the probe tip. The second width is larger than the first width and defines an external surface of the second portion configured to engage with an external object. A temperature sensing element is configured to generate a sensing signal representing a temperature of the external object. The temperature sensing element is secured to an internal surface of the second portion of the probe tip. The internal surface is opposite and in thermal communication with the external surface.

According to a particular implementation of this class, the temperature sensing element comprises a thermistor, a thermocouple, or a resistance temperature detector (RTD).

According to a particular implementation of this class, the temperature sensing element comprises a resistance temperature detector (RTD) having a planar orientation. The probe tip includes two conductors extending from the RTD into the first internal cavity of the first portion of the probe tip in a direction substantially perpendicular to the planar orientation of the RTD. According to a more specific implementation, a potting material in the first internal cavity of the first portion of the probe tip encompasses the RTD and the two conductors.

According to a particular implementation of this class, a third portion is connected to the first portion. The third portion has a third width in a direction normal to the central axis of the probe tip. The third width is larger than the first width. The third portion also has a second internal cavity adjacent the first internal cavity of the first portion that includes at least a portion of the central axis of the probe tip. The second internal cavity is configured to receive a spring configured to force the external surface of the second portion of the probe tip toward the external object.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes various devices, systems, and techniques relating to the monitoring of various types of components in a pressurized system. These devices, systems, and techniques include battery-less monitors that run on power harvested from their environments, systems for acquiring monitor data for the components of a pressurized system in a facility (or across multiple facilities), and/or techniques for processing monitor data to reliably determine the status of individual components and potentially other system parameters. It should be noted that the described examples may be used in various combinations. It should also be noted that at least some of the examples described herein may be implemented independently of the others. For example, the techniques described herein for capturing accurate temperature readings of system components may be employed with any of a wide variety of monitors including, but not limited to, the monitors described herein. Similarly, the monitors described herein that co-locate disparate monitor components may be used with any of a wide variety of monitoring systems and data processing techniques including, but not limited to, the systems and techniques described herein.

Figure 1:
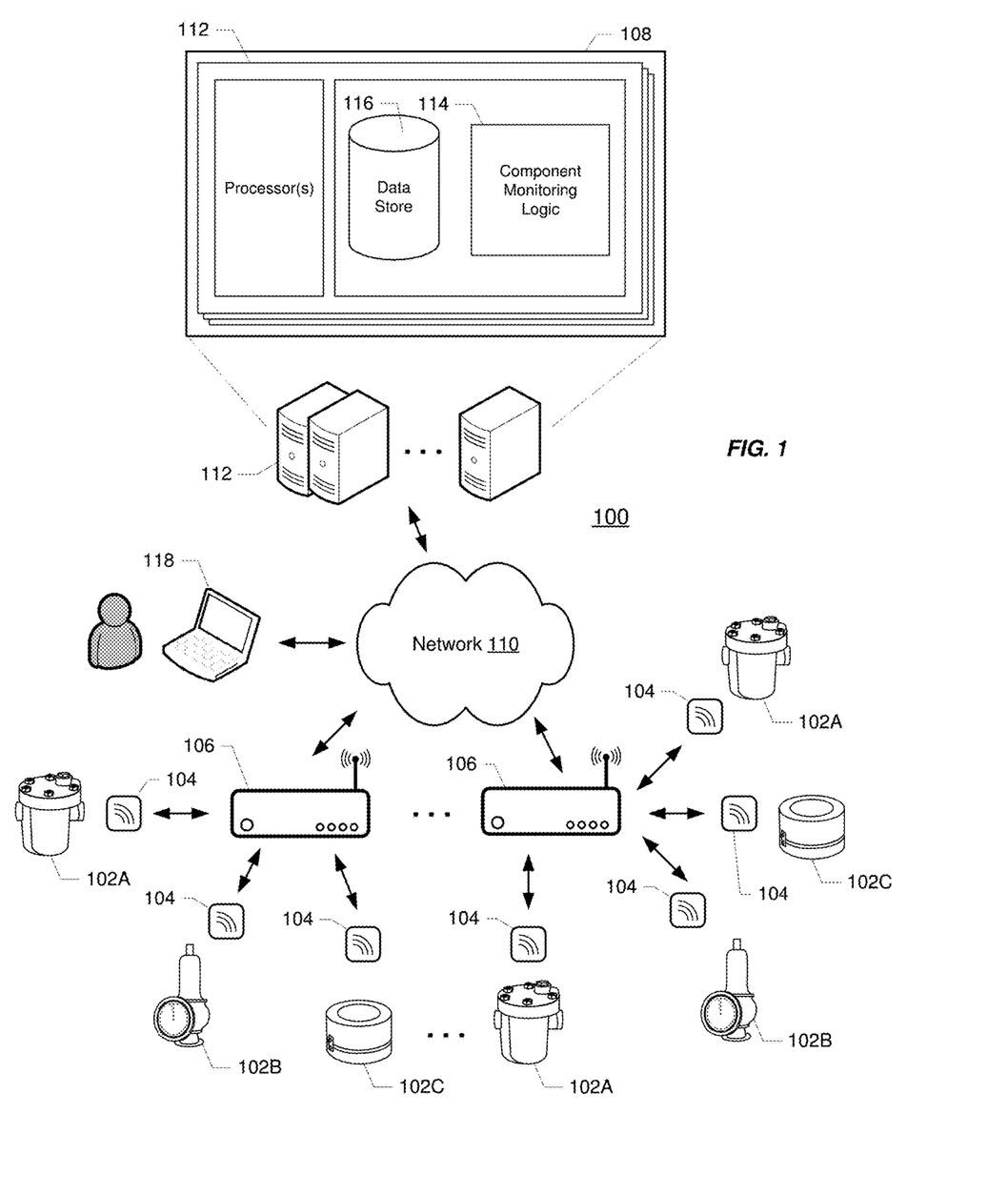
FIG. 1 depicts an example of a pressurized system and a cloud-connected monitoring system enabled by the present disclosure.

FIG. 1 depicts a monitoring system 100 in which various types of pressurized system components, e.g., steam traps 102A, safety valves 102B, and rupture discs 102C, (potentially hundreds or even thousands of such components) are deployed throughout a facility that employs a steam system. The details of the steam system are not shown for reasons of clarity. Moreover, it should be noted that the steam system of FIG. 1 is merely an example of a pressurized system that may be implemented and/or monitored using the techniques described herein. In addition, the pressurized system components in FIG. 1 are depicted as particular types of components (e.g., steam trap 102A is shown as an inverted bucket steam trap). However, it should be noted that the depicted components are merely examples of some of the types of components that may be monitored as described herein. That is, the systems, monitors, and techniques described herein may be used with any of a variety of devices and components including, for example, pressure relief valves, safety relief valves, rupture discs, control valves, pressure reducing valves, steam traps, and the like, without departing from the scope of this disclosure.

Each component 102 has an associated monitor 104 mounted on or near the component. Monitors 104 generate various types of sensor data relating to the associated component 102 and/or its adjacent piping. Monitors 104 transmit the sensor data to control nodes 106 that, in turn, transmit the sensor data to a monitor data service 108 via network 110. As will be appreciated, the number of monitors 104 and control nodes 106 will vary depending on the facility.

Monitor service 108 may conform to any of a wide variety of architectures such as, for example, a services platform deployed at one or more co-locations, each implemented with one or more servers 112. Monitor service 108 may also be partially or entirely implemented using cloud-based computing resources. Network 110 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on.

At least some of the examples described herein contemplate implementations based on computing models that enable ubiquitous, convenient, on-demand network access to a pool of computing resources (e.g., cloud-based networks, servers, storage, applications, and services). As will be understood, such computing resources may be integrated with and/or under the control of the same entity controlling monitor data service 108. Alternatively, such resources may be independent of service 108, e.g., on a platform under control of a separate provider of computing resources with which service 108 connects to consume computing resources as needed, e.g., a cloud-computing platform or service.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

Monitors 104 may communicate with control nodes 106 using any of a wide variety of wired and wireless protocols and technologies. According to some implementations, control nodes 106 and monitors 104 communicate using a proprietary low-power communication protocol known as Evernet™ provided by Everactive™, Inc., of Santa Clara, California. Examples of such protocols and associated circuitry suitable for use with such implementations are described in U.S. Pat. Nos. 9,020,456 and 9,413,403, and U.S. Patent Publications No. 2014/0269563 and No. 2016/0037486, the entire disclosure of each of which is incorporated herein by reference for all purposes. However, it should be noted that implementations are contemplated in which other modes of communication between the monitors and the rest of the system are employed.

Control nodes 106 may be implemented using any of a variety of suitable industrial Internet gateways, and may connect to monitor service 108 using any of a variety of wired and wireless protocols, e.g., various versions of Ethernet, various cellular (e.g., 3G, LTE, 5G, etc.), various wi-fi (802.11b/g/n, etc.), etc. In some cases, otherwise conventional gateways are augmented to include components that implement the Evernet™ protocol.

Each monitor 104 generates sensor data representing one or more temperatures associated with the component with which it is associated, and possibly other sensed data associated with the component such as ultrasonic, acoustic, or vibration measurements. Temperature measurements may be captured using one or more temperature sensors (e.g., thermistors, thermocouples, resistance temperature detectors (RTDs), etc.) connected to the piping at the inlet side of the component (e.g., the steam side of a steam trap) and/or the outlet side of the component (e.g., the condensate side of a stream trap). The monitors may also be configured to capture and generate sensor data representing ambient temperature and/or humidity of the environment in which the monitor is deployed.

Each monitor 104 may also be configured to generate sensor data representing a variety of other parameters generated by a variety of sensor types and/or sources. For example, a monitor might include sensors configured to measure and/or track light levels, humidity, vibrational or other types of mechanical energy, acoustic energy, ultrasonic energy, etc.

According to a particular implementation, in response to a wakeup message from its control node 106 or a local wakeup timer, each monitor 104 transitions from a low-power mode, takes readings on each of its sensors, and transmits digitized versions of the readings to its control node 106 in a packet in which each sensor and its reading are paired (e.g., as a label-value pair). The packet also includes information (e.g., in a header) that identifies the specific monitor with a unique identifier and the timestamp of the readings in the packet. The wakeup messages may be periodically transmitted from each control node to its associated monitors. In this way, each monitor 104 "continuously" monitors the component with which it is associated.

Each control node 106 stores the packets received from its monitors 104 in local memory, and periodically or opportunistically uploads the stored information to monitor data service 108 (e.g., to a cloud-based service when the control node is connected to the Internet). Thus, if there is an outage, the control node is able to cache the sensor data until the connection is restored. At least some of the processing of the sensor data may be done by monitor data service 108, e.g., using logic 114. However, it should be noted that implementations are contemplated in which at least some of the processing of the data generated by monitors 104 may be performed elsewhere, e.g., by monitors 104 and/or by control nodes 106. Monitor data service 108 may also store historical data for monitoring system 100 (e.g., in data store 116). The monitor data and other system data generated and/or received by monitor data service 108 and stored in data store 116 may be accessed on demand (e.g., in a dashboard on computing device 118) by responsible personnel associated with the facility or facilities in which the steam trap monitoring system is deployed.

Some techniques for determining the state of a component in a pressurized system rely on measurement of the temperatures on both the inlet and outlet sides of the component. For example, steam temperature and condensate temperature are useful for determining the state of a steam trap because a steam trap is designed to collect condensate that forms in the steam system at or near where the trap is deployed. A steam trap is usually installed at low points in the steam distribution system. Every so often, the steam trap expels collected condensate into a drain line. When a steam trap fails, it often fails to a condition which results in steam going straight through the trap into the drain line.

In a simple example, the steam side of a steam trap is typically expected to be at or near the temperature of live steam (e.g., well over 100 degrees C.). By contrast, because of the presence of condensate, the condensate side of the trap is typically expected to be at a lower temperature than the steam side of the trap. If a steam trap fails open, this may be detected based on a higher than expected temperature at the condensate side of the trap relative to the steam temperature.

Techniques that monitor both sides of a component require either two monitors or, if a single monitor is used, wiring that runs across the component. As will be appreciated by those of skill in the art, while the latter approach is highly preferable to the former from a cost and maintenance perspective, the wiring introduces a vulnerable point of failure in addition to potentially interfering with maintenance of the pressurized system. Thus, the present disclosure also contemplates techniques for monitoring a component in a pressurized system using a single monitoring device connected to either the inlet side or the outlet side of the component.

Figure 2:
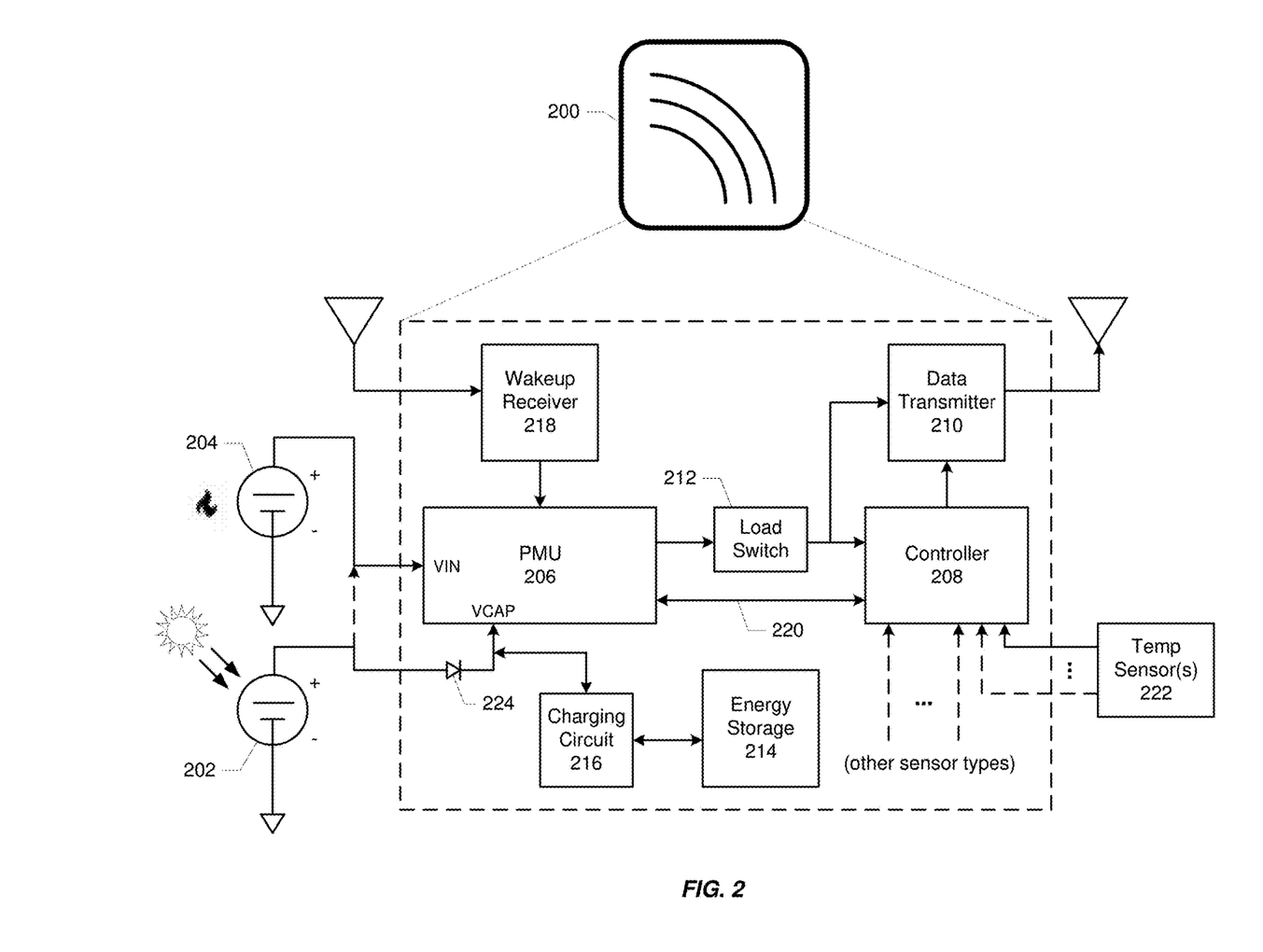
FIG. 2 is a block diagram of a monitor enabled by the present disclosure.

According to some implementations, monitors for components in a pressurized system are employed that operate using power harvested from the environments in which they are deployed. FIG. 2 is a block diagram of an example of such a monitor 200. In the depicted implementation, monitor 200 is powered using energy harvested from its environment with a thermoelectric generator (TEG) 204 that captures thermal energy (e.g., from the pipes of the pressurized system) and a photovoltaic (PV) device 202 that captures energy from the ambient light in the vicinity of monitor 200. Implementations are contemplated in which the monitor's power management unit may be configured such that the monitor can use power from the PV device in a "solar only" mode (as indicated by the dashed line from PV device 202 to VIN), the TEG in a "TEG only" mode, or a combination of both in a "solar assist" mode (as indicated by the solid line from PV device 202 to VCAP). Suitable switching circuitry for configuring these connections will be known to those of skill in the art and so is not depicted for clarity.

Monitor 200 includes a power management unit (PMU) 206 that controls the delivery of power to controller 208 and data transmitter 210 via load switch 212. VIN is the harvesting input to PMU 206, and VCAP, and three voltage rails (not shown for clarity) are the generated outputs. PMU 206 charges energy storage device 214 (e.g., a super-capacitor) with VCAP via charging circuit 216 using energy harvested from either or both of PV device 202 and TEG 204 (depending on the harvesting mode). Load switch 212 and charging circuit 216 control when power is provided to the rest of monitor 200 and allow monitor 200 to be functional while energy storage device 214 is charging.

Monitor 200 receives a wakeup message (e.g., with wakeup receiver 218) from, for example, a system control node with which it is associated. Receipt of the wakeup message triggers control of load switch 212 by PMU 206 to provide power to controller 208 for capturing readings associated with the system component being monitored by monitor 200, and to transmitter 210 for transmitting sensor data to the control node. PMU 206 also communicates with controller 208 via digital I/O channel 220. This can be used by the controller to monitor the status of the PMU 206, and to update its configuration or calibration settings.

Once awakened and powered up, controller 208 captures readings using one or more sets of sensors associated with monitor 200. As depicted, these might include one or more temperature sensors 222 (e.g., a thermistor, thermocouple, or RTD connected to the piping adjacent the inlet side or the outlet side of the component). Sensors to detect or measure other parameters or types of readings (e.g., ambient temperature and/or light, acoustic, ultrasonic, humidity, vibrational/mechanical energy, etc.) are also contemplated. As discussed above, controller 208 packetizes the digitized sensor data and transmits the packet(s) to the associated sensor node via data transmitter 210.

According to a particular implementation, PMU 206 includes a boost DC-DC converter that employs maximum power point tracking to boost the relatively low voltage VIN received from one of the harvesting sources (e.g., PV device 202 or TEG 204 depending on the mode) to a higher voltage VCAP at its output that is used to charge the energy storage device (e.g., 214). Once VCAP is sufficiently high, a buck/boost, a single-input-multiple-output (SIMO) DC-DC converter turns on and takes VCAP and brings it up or down (depending on the level of charge of energy storage device 214), generating three voltage rails; +2.5, +1.2, and +0.6 volts respectively. These voltage rails are for use in powering the other electronics of monitor 200 (e.g., controller 208 and transmitter 210).

In the "solar assist" harvesting mode, PV device 202 may be attached directly to VCAP through diode 224 (to prevent leakage) as represented by the solid line connection in FIG. 2. In this mode, and assuming its output is sufficient to forward bias diode 224, PV device 202 may provide a charging assist to TEG 204 with the energy of the two harvesting sources naturally combining in energy storage device 214 without requiring complicated control electronics. According to a particular implementation, in the "solar assist" mode, PV device 202 is used to raise VCAP such that the biasing to the boost converter turns on. This allows the boost to harvest from lower input voltages (e.g., allowing harvesting from lower temperature deltas on TEG 204). In another implementation, PV device 202 may connect to VIN of PMU 206 as shown by the dashed line in FIG. 2. This allows for lower levels of light, or lower voltage PV cells to be boosted to recharge the energy storage element.

More generally, implementations are enabled by the present disclosure in which energy may be harvested from multiple different energy sources and used in any combination to power such monitor. Other potential sources for harvesting include vibration energy (e.g., using a piezoelectric-based or a linear motion, electromagnetic-based device) and RF energy. As will be appreciated, these are AC energy sources and so would require AC-DC converters. And if the resulting DC voltages from any of these are not sufficiently high, they could be boosted using a boost converter.

According to some implementations, temperatures for a pressurized system component may be measured at multiple locations on the same side of the component. For example, multiple temperatures may be measured on the conduit connected to the component inlet or outlet at different distances along the conduit. This might be useful, for example, in differentiating between real failures and false-positive failures induced by nearby components. In another example, multiple temperatures may be measured at locations along the circumference of the same conduit. The idea is that differences between these temperatures may be indicative of specific conditions or states of the component, and so may be used to learn how to detect such conditions or states.

According to a particular implementation, two temperatures are measured along the circumference of the inlet conduit or the outlet conduit; one at the top of the conduit and one at the bottom. This approach may be particularly useful, for example, in applications in which the material flowing through the conduit is actually two media, one of which is heavier than the other, e.g., a gas at the top and a liquid on the bottom. As will be appreciated, the two different media are likely to have different temperatures, particularly where they are two different phases of the same substance. Both the expected behavior and one or more failure modes may therefore be learned using this information as input. For example, the weighting of one phase versus another can be an indicator of not only a failure, but the severity of the failure. For example, if the output of a steam trap is almost entirely steam, then the trap failure is most likely a blow-through as no liquid has been allowed to build up. Conversely, if the output of the steam trap is primarily a liquid, this could indicate that the trap is inadequate for the application and is not discharging condensate fast enough.

Implementations are also contemplated in which multiple points of monitoring on a conduit of a pressurized system are not necessarily associated with a particular or distinct system component apart from the conduit itself. That is, while such an approach may be used to infer or determine one or more states of a system component such as a safety valve or a rupture disc, it may also be used to infer or determine one or more states of the system including, for example, the presence or state of a medium or media within the conduit. For example, monitoring the temperature at the top and bottom of a conduit (e.g., around the circumference of the conduit) may yield time-series data from which the relative amounts of two different media within the conduit (e.g., steam and condensate) may be inferred or determined with reference to baselines or models developed as disclosed herein. In another example, monitoring temperatures spaced apart along the longitudinal axis of a conduit may yield time-series data representing temperature differentials that may be indicative of a particular state or states of the medium or media in the conduit, a portion or components of the system, and/or the system as a whole. In another example, multiple temperatures associated with a conduit having a particular shape (e.g., a bend in a conduit or a "U" trap) could represent a variety of conditions. More generally, a variety of system states may be inferred or determined from such time-series data based on corresponding baselines or models. The scope of the present disclosure should therefore not be limited by reference to specific implementations relating to particular types of system components, baselines or models, or particular component or system states.

As mentioned above, implementations are also contemplated in which system and/or component state may be determined based on temperature measurements associated only with the inlet of a system component. For example, a blow through failure of a steam trap in a steam system may be detected based on inlet temperature data alone. During normal operation, the pressure on the inlet of a stream trap (and therefore the temperature) is typically maintained at an expected level or within an expected range. If a blow through failure occurs, this reduces the pressure at the inlet, causing the temperature to drop. This drop and the corresponding failure can be detected based on monitoring of the inlet temperature alone.

In another example, a cold failure of a stream trap results in a temperature drop at the inlet of the trap due to the accumulation of condensate backing up and cooling the conduit as compared to the much hotter temperature of steam that is predominantly present during normal operating conditions. Again, this failure may be detected by monitoring inlet temperature alone.

Moreover, the ability to distinguish between different types of failures may be supported using inlet-only monitoring. For example, distinguishing between the blow through and cold failures described above may be accomplished though comparisons of the absolute temperature drop for each data set, as well as the rates of change for drops represented by the respective data sets.

As will be appreciated with reference to the foregoing examples, the techniques described herein may be adapted to monitor the behavior of a wide range of components in various types of pressurized systems.

A specific implementation of a sensor system will now be described with reference to FIGS. 3-9. The described implementation is depicted in the context of steam system and, in particular, in a configuration for monitoring a steam trap. As discussed above, and as will be appreciated by those of skill in the art, this context is merely for illustrative purposes. As will also be appreciated, various aspects of the depicted implementation may not be necessary and/or may be implemented separately or in various combinations in other implementations.

Figure 3:
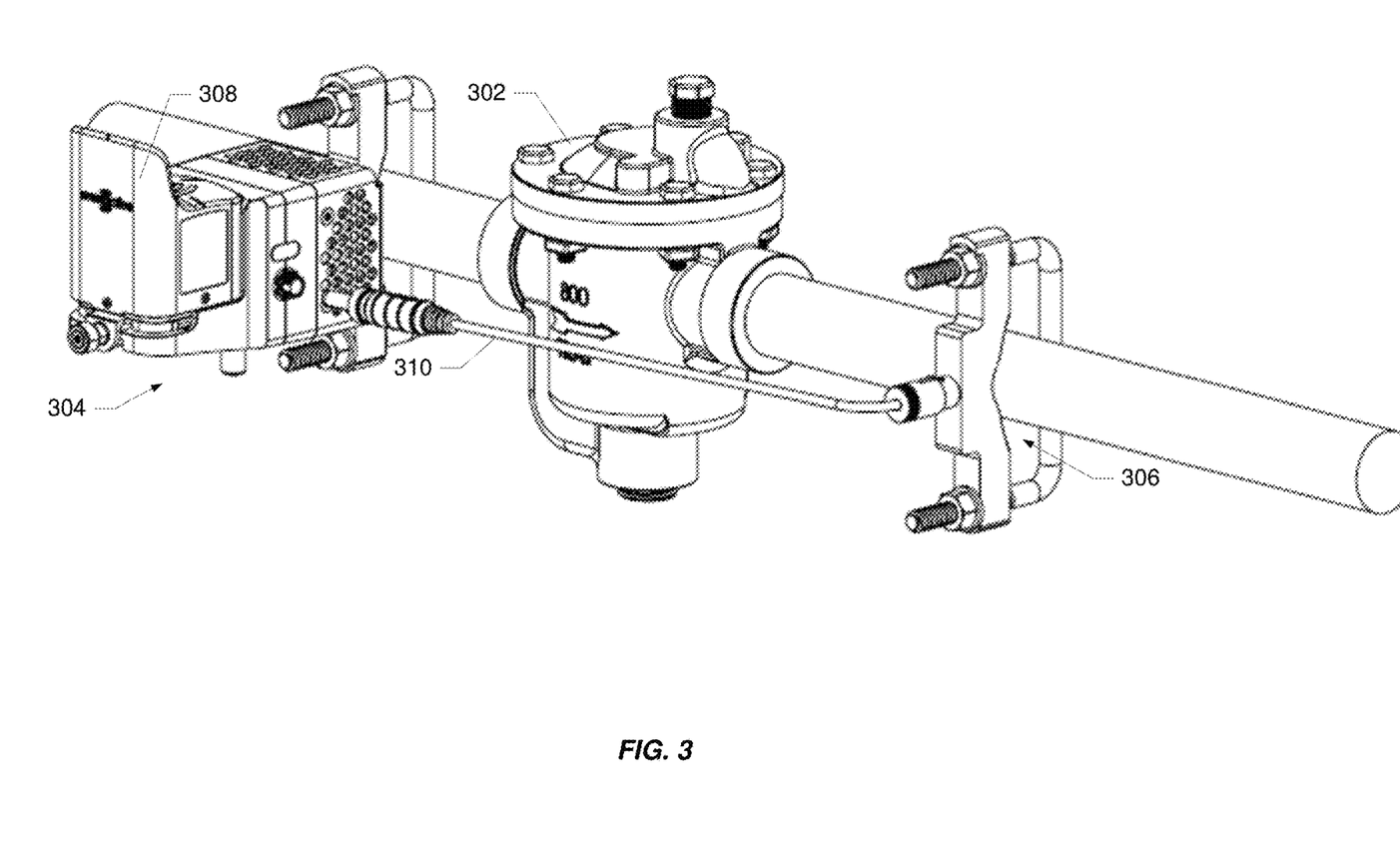
FIG. 3 is a perspective view of an installed monitor enabled by the present disclosure.

FIG. 3 shows a sensor system for monitoring both the steam side and condensate side of a stream trap 302. The sensor system includes a sensor-harvester module (SHM) 304 that, in the depicted implementation, is mounted on the steam-side conduit connected to steam trap 302. The depicted sensor system also includes a remote temperature sensor module (RTM) 306 mounted on the condensate-side conduit of steam trap 302 and connected to sensor electronics of SHM 304 (in housing 308) via semi-rigid cable 310 and an adaptor board (shown more clearly in FIG. 4). SHM 304 includes the adaptor board, a temperature sensor, and a thermal power harvesting component (not shown in FIG. 3). As will be discussed, the design of SHM 304 enabled by the present disclosure allows for the co-location of these various components in a single unit. This is to be contrasted with a previous generation sensor system in which these components are in separate locations. For example, in the previous system, the energy harvester would typically be mounted directly on a steam conduit while the electronics would be separately mounted on the insulation around the conduit.

As discussed above, various design considerations associated with the components integrated in SHM 304 present challenges to co-location. Because SHM 304 includes a temperature sensor, it is desirable to isolate the temperature sensor from other thermal masses to ensure the most accurate reading possible. Because the sensor system is powered using thermal energy harvested from the environment, it is desirable to locate the energy harvester (which represents a significant thermal mass) to collect as much heat as possible. Finally, it is important to protect the sensor electronics (e.g., rated to about 80° C.) from the heat source which, in a steam system, may reach temperatures of 200° C. or more. The various components of SHM 304 will now be described with reference to FIGS. 4-7, beginning with the exploded view of FIG. 4 and the cross-sectional view of FIG. 5.

Figure 4:
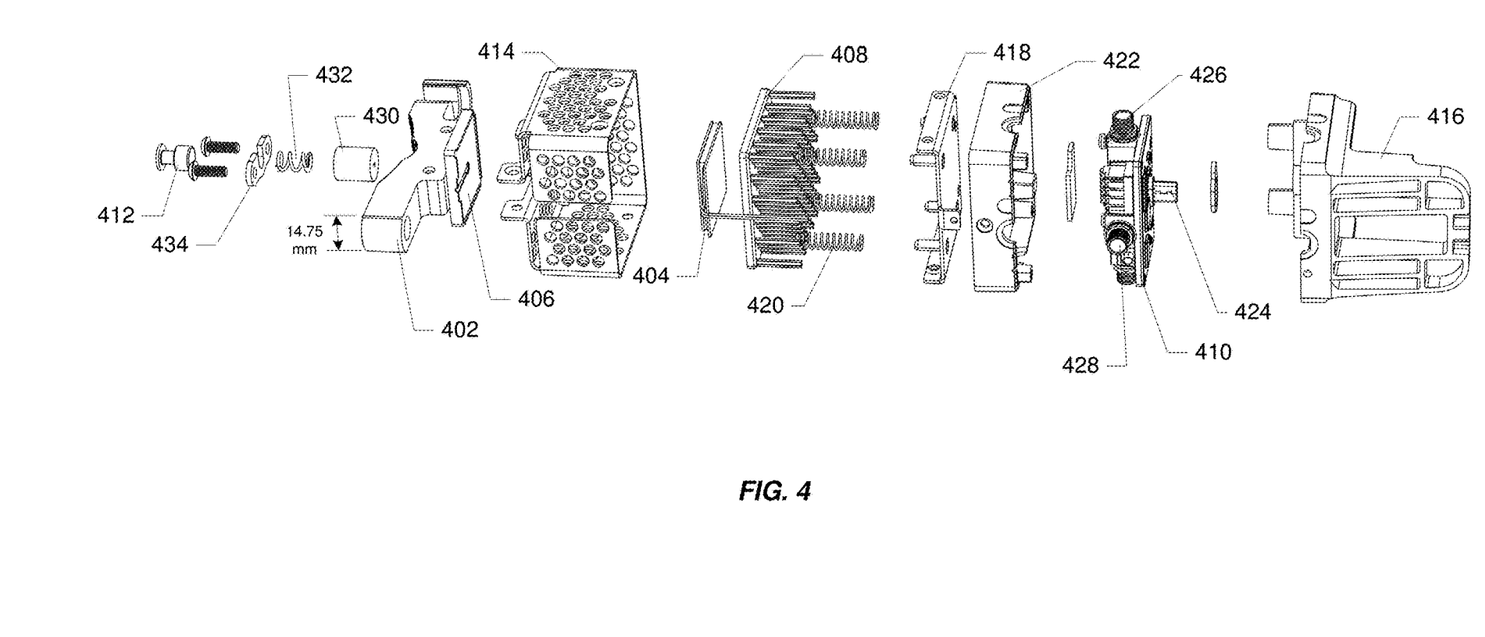
FIG. 4 is an exploded view of components of a sensor-harvester module enabled by the present disclosure.
Figure 5:
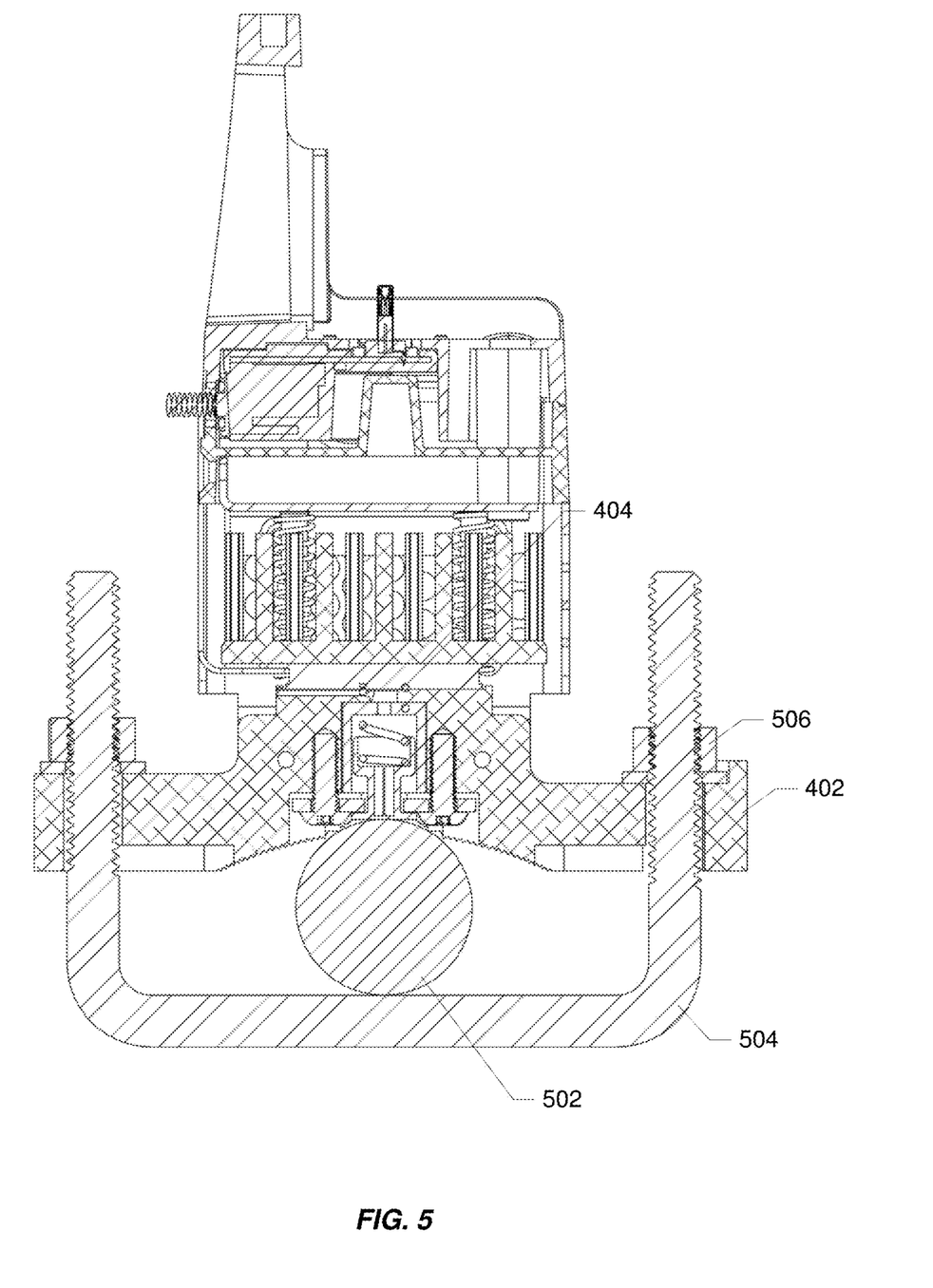
FIG. 5 is a partial cross-sectional view of a sensor-harvester module mounted on a conduit according to a particular implementation.
Figure 6:
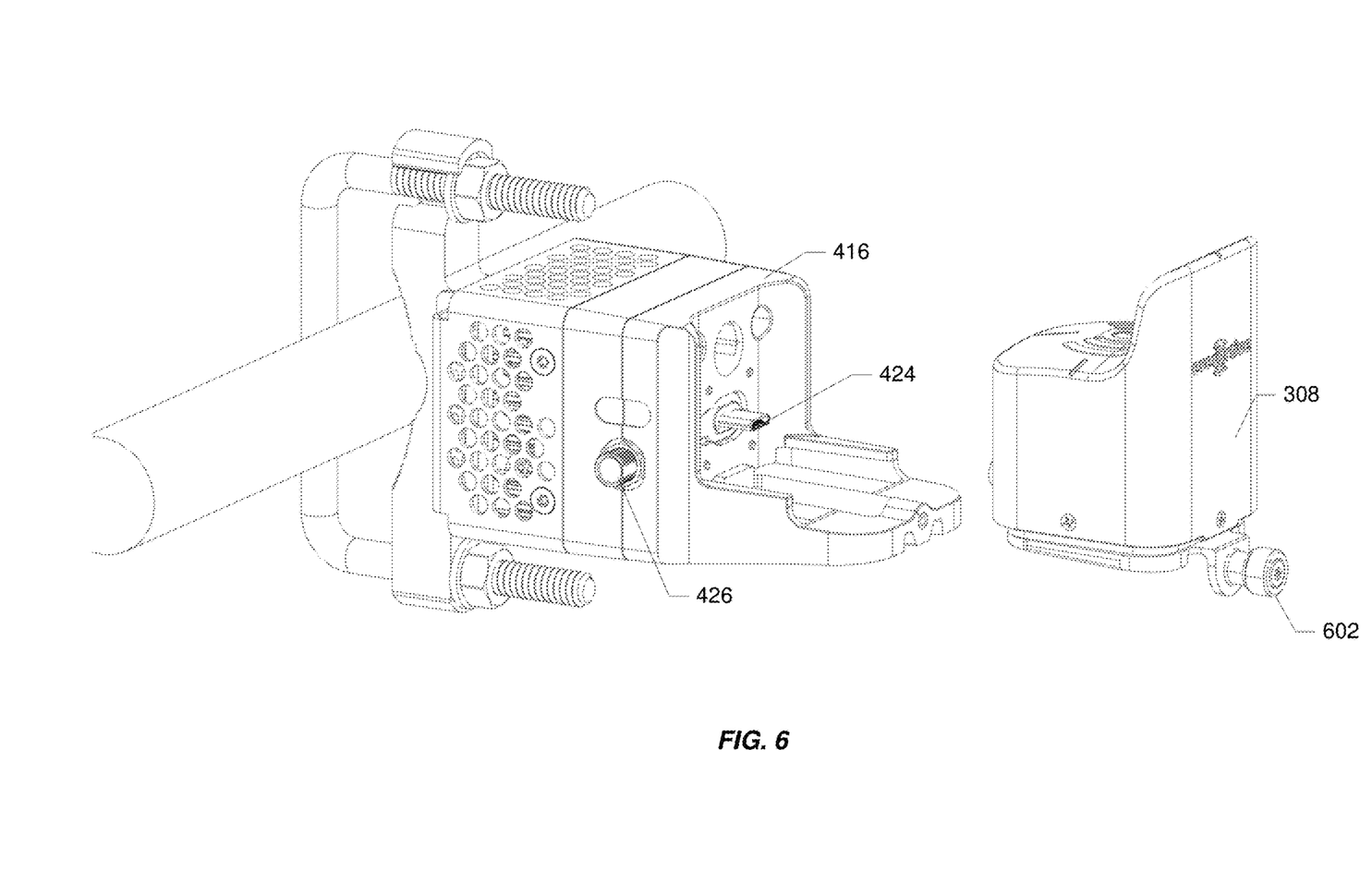
FIG. 6 is a perspective view illustrating the relationship between a sensor electronics housing and other components of a sensor-harvester module according to a particular implementation.

Mount 402 secures the SHM to conduit 502 with a U-bolt 504 using nuts 506. According to a particular implementation, nuts 506 are stainless steel nuts that have a thermally dissipative coating that resists galling (i.e., seizing up when heat is applied), a common problem for stainless steel fasteners, particularly with the application of heat. According to a particular implementation, mount 402 is constructed from aluminum and has nickel plating (e.g., high phosphorus electroless nickel plating) for chemical resistance. This combination is good for heat transfer and stands up well to the harsh environmental conditions.

According to a particular implementation, the thickness of mount 402 is about 14.75 mm or less while maintaining its robustness and optimal thermal performance for both the TEG and the temperature probe. This feature is advantageous because of the limited amount of space on steam pipes, enabling the SHM to fit into tight locations.

TEG 404 sits on platform 406 of mount 402. A heat sink 408 is mounted on the opposite side of TEG 404 to achieve the temperature differential necessary to generate the TEG's output voltage. There are wires (not shown) that extend from TEG 404 to adaptor board 410. There are also wires (not shown) that extend from a temperature sensor (not shown) in probe tip 412 to adaptor board 410.

A sheet metal cage 414 protects some of the components of the SHM while also providing a way to connect various other components of the SHM. Cage 414 includes holes that slow down heat transfer to the sensor electronics of the SHM which sit on front adaptor housing 416, helping to achieve the thermal isolation of the sensor electronics from the heat of the conduit on which the SHM is mounted. The holes of cage 414 also allow airflow to promote the function of heat sink 408.

TEG 404, heat sink 408, backing plate 418, and springs 420 are inside cage 414 when the SHM is fully constructed. Backing plate 418 is secured to cage 414 with four screws, with springs 420 applying force to heat sink 408, sandwiching TEG 404 between heat sink 408 and mount 402 to promote thermal conductivity from mount 402 to the left or "hot" side of TEG 404 and from the right or "cold" side of TEG 404 to heat sink 408. Springs 420 also accommodate thermal expansion or contraction. Compressing these components with springs 420 was found to be better than using adhesive because typical adhesives conventionally used for such applications do not transfer heat well. According to a particular implementation, there is a small gap between the ends of the fins of heat sink 408 and the inside surface of backing plate 418 to minimize contact of the heat sink to the backing plate to further inhibit the transfer of heat to the adaptor board and the sensor electronics. In addition, springs 420 also radiate heat along each coil.

Rear adaptor housing 422 mounts to backing plate 418 and includes a cavity in which adaptor board 410 sits. According to a particular implementation, rear adaptor housing 422 is constructed from a polymer which is a hybrid of polycarbonate and polyethylene terephthalate (PET), a hybrid polymer characterized by enhanced chemical resistance and high impact strength that is also not a particularly good conductor of heat. Further, when adaptor board 410 (which is secured to front adaptor housing 416) is in the cavity of rear adaptor housing 422, there is an air gap between adaptor board 410 and the bottom surface of the cavity that acts to further inhibit the transfer of heat. A low-pressure overmold, e.g., an industrial polyamide hot melt resin (not shown), may cover adaptor board 410 to protect it from dust, moisture, and high temperatures.

Adaptor board 410 acts as a hub, connecting to external cables (not shown), as well as the wires from the integrated temperature sensor and TEG 404. Such external cables might be connected, for example, to one or more remote temperature sensors (e.g., RTM 306), a photovoltaic harvester, a remote TEG, etc. In the depicted implementation, adaptor board 410 includes a USB-C connector 424 which is the primary interface to the sensor electronics in the electronics housing (which sits on front adaptor housing 416). The relationship of the sensor electronics housing (e.g., housing 308 of FIG. 3) to connector 424 and front adaptor housing 416 may be understood with reference to FIG. 6. Sensor electronics housing 308 module slides onto front adaptor housing 416, mates with USB-C connector 424, and is secured in place with a single mounting screw 602.

Connector 424 provides the temperature sensor signal from the temperature sensor of the SHM and the voltage from TEG 404. According to some implementations, adaptor board may also include one or more additional connectors (e.g., 426 and 428) for receiving a temperature sensor signal from an additional temperature sensor (e.g., a sensor associated with RTM 306 of FIG. 3), an additional sensor signal(s) from one or more additional sensors, and/or auxiliary harvested energy from one or more additional energy harvesters. For example, an additional connector might receive auxiliary power from a separate harvesting unit such as, for example, a solar cell or a remote TEG (which might be necessary, for example, if the conduit being monitored doesn't provide enough heat). Such a remote TEG might be associated with, for example, a separate nearby SHM unit.

The sensor electronics in the electronics housing may be implemented as described above with reference to FIG. 2. However, it should be noted that implementations are contemplated in which other types of sensor electronics are employed. According to various implementations, the sensor electronics convert the information received via adaptor board 410 to a form that is suitable for transmission to other components of the monitoring system (e.g., a control node 106 as depicted in FIG. 1).

According to a particular implementation, the components of the SHM are designed to inhibit heat transfer so that adaptor board 410 does not see a temperature above about 50° C. when the conduit to which the SHM is mounted has a surface temperature of about 200° C. and the ambient temperature is at about 25° C. According to such an implementation, TEG 404 can harvest thermal energy in the range of about 60-200° C. without damaging the electronics integrated with the SHM. TEG 404 can also provide sufficient energy to power sensor electronics 308 from a conduit surface temperature of as low as 60° C. when the ambient temperature is at 25° C.

According to some implementations, various components of the SHM are configured to facilitate heat transfer to the temperature sensor (e.g., from the conduit) while isolating the temperature experienced by the temperature sensor from other components of the SHM (e.g., the SHM mount and the TEG). According to a particular implementation, and referring again to FIG. 4, these components include centering sleeve 430, spring 432, retaining plate 434, and probe tip 412. A particular implementation of probe tip 412 is also depicted in the cross-sectional view of FIG. 7.

Figure 7:
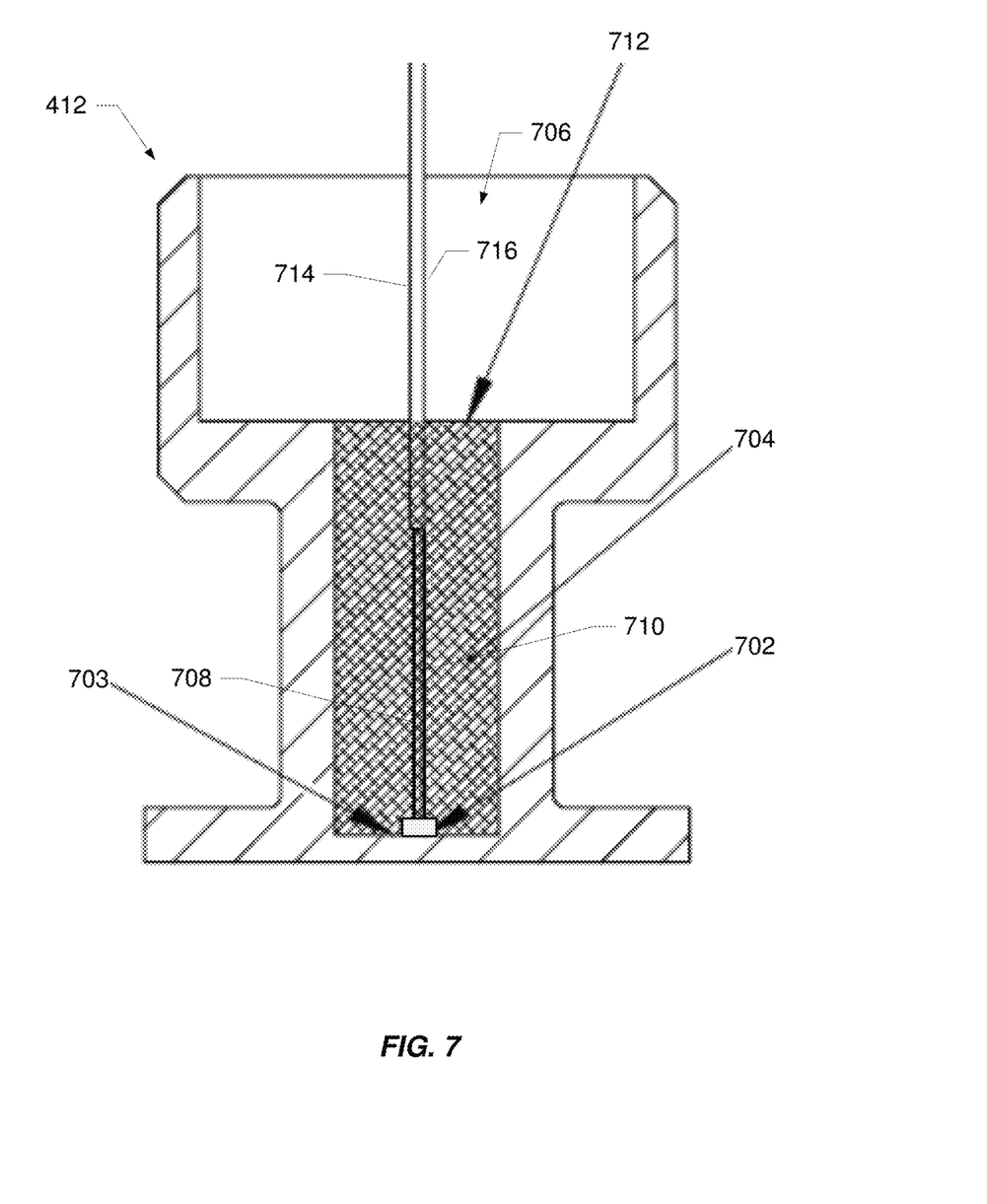
FIG. 7 shows a cross-sectional view of a probe tip enabled by the present disclosure.

Probe tip 412 is a nickel-plated machined aluminum part inside which the temperature sensor (RTD 702 in the depicted implementation) is secured and which is then filled with a potting material 704. An RTD was selected for this implementation based on specific accuracy and environmental requirements. However, it should be noted that other types of temperature sensors (e.g., thermistors, thermocouples, etc.) may be employed depending on the requirements of a given implementation. Cavity 706 of probe tip 412 fits spring 432 which forces the probe tip against the conduit to which the SHM is mounted.

According to a specific implementation, centering sleeve 430 and retaining plate 434 are constructed from a polyether ether ketone (PEEK) material, an organic thermoplastic polymer in the polyaryletherketone (PAEK) family. Centering sleeve 430 and retaining plate 434 provide a degree of isolation of the temperature of probe tip 412 from the rest of the SHM. The compression force of spring 432 was selected to ensure optimal heat transfer from the conduit to probe tip 412. The shape of probe tip 412 results in a large surface area for contacting the conduit relative to the diameter of the probe tip in which the RTD is secured. This surface area allows for the capture of accurate temperature readings without breaching the conduit. According to a specific implementation, the features described above improved the accuracy of the temperature captured by probe tip 412 from the ±20° C. to ±5° C. compared to previous probe designs with requiring an enlarged surface area.

In the implementation depicted in FIG. 7, RTD 702 is a rectangular element secured to the inner surface of the portion of the probe tip 412. Two leads 708 and 710 extend normal to the surface of RTD 702, i.e., so the leads are properly oriented to travel up the central axis of the probe tip. This is distinguished from conventional RTDs in which the leads are typically aligned with the primary plane of the RTD and so then need to be bent to accommodate the routing shown in FIG. 7. Once RTD 702 is secured to the inner surface 703 of probe tip 412, cavity 712 is filled potting material 704. RTD leads 708 and 710 are connected to special RTD wires 714 and 716 that extend through the intervening SHM components to adaptor board 410; in the depicted implementation, a distance of 6 inches. Spring 432 sits in cavity 706 of probe tip 412, applying force on probe tip 412 from centering sleeve 430, and thereby forcing probe tip 412 against the conduit.

Figure 8:
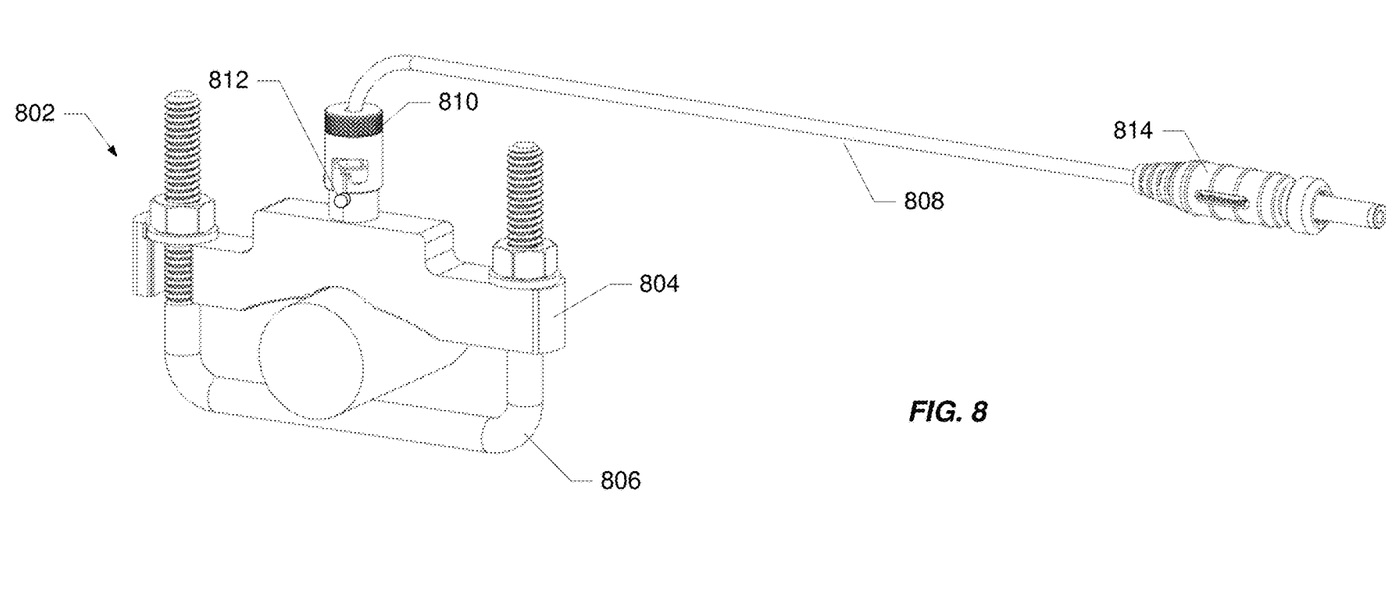
FIG. 8 is a perspective view of a remote temperature module and a semi-rigid connection cable enabled by the present disclosure.

As mentioned above, in addition to an SHM, some implementations employ a remote temperature sensor module (RTM) (e.g., RTM 306 of FIG. 3) mounted at a separate location in the system being monitored (e.g., on the condensate-side conduit of steam trap 302 of FIG. 3). As shown in FIG. 8, RTM 802 may be secured to a conduit using an RTM mount 804 and U-bolt 806 that are constructed using materials similar to those in the mounting hardware of the SHM. The temperature sensor included in RTM 802 is connected to the sensor electronics of the SHM (e.g., via adaptor board 410 of FIG. 4) via semi-rigid cable 808.

Figure 9A:
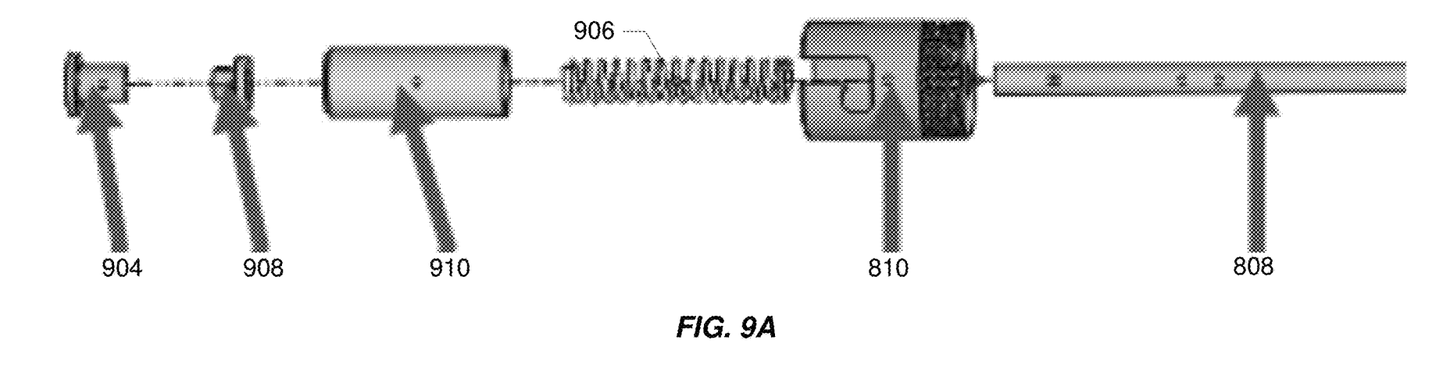
FIGS. 9A and 9B show exploded and cross-sectional views of a portion of a remote temperature module enabled by the present disclosure.
Figure 9B:
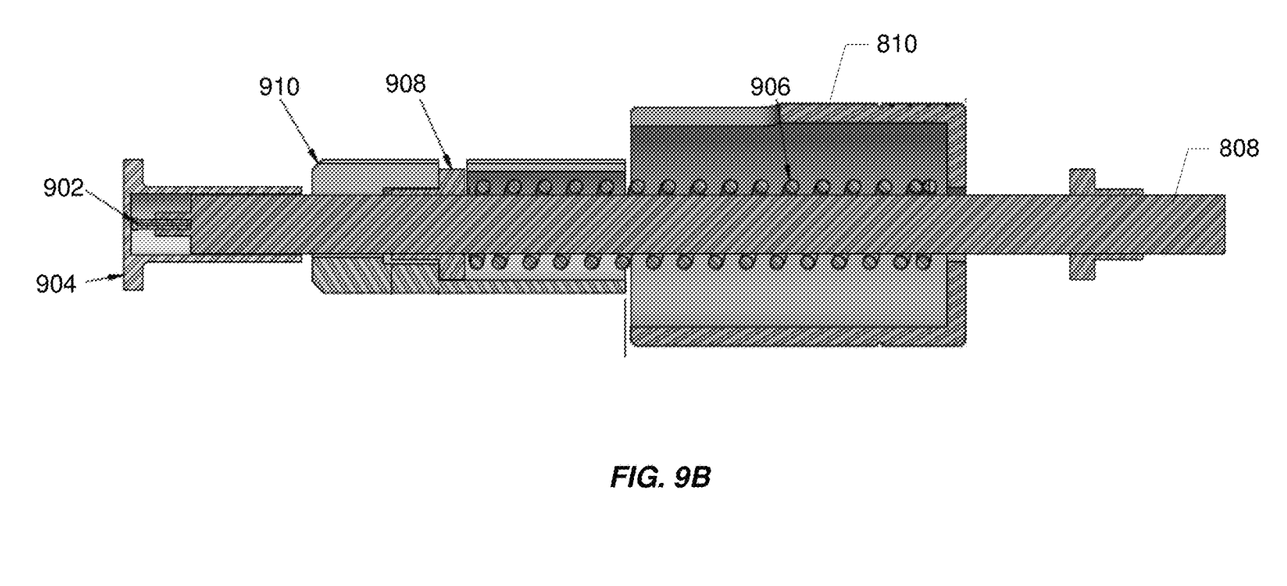

According to a particular implementation illustrated in FIGS. 9A and 9B, the temperature sensor of RTM 802 is an RTD 902 secured in a probe tip 904 in a manner similar to that described above with reference to probe tip 412 and RTD 702 of FIG. 7. Probe tip 904 is constructed of the same material and has a similar design as the portion of probe tip 412 that includes cavity 712, and smaller than that corresponding portion of probe tip 412 to accommodate space limitations at the remote monitoring location. For example, it is often the case that there is considerably less space available for mounting monitoring components on the condensate side of a steam trap than there is on the steam side.

Cable 808 includes a semi-rigid stainless steel jacket that allows it to be bent around obstacles while retaining its shape and remaining away from the components of the pressurized system being monitored (e.g., the conduits and steam trap) without having to secure it in place (e.g., with tie wraps).

Cable 808 is secured to RTM 802 using a bayonet connector 810 that allows quick assembly to and disassembly from RTM mount 804 once it is secured to the conduit by a quick quarter turn over bayonet adaptor 812. Spring 906 is compressed by the action of bayonet connector 810 on bayonet adaptor 812. Spring 906 does not exert force directly on probe tip 904 (in contrast with the SHM) but instead on a crimped washer 908 that is mechanically connected to probe tip 904 by crimping washer 908 to cable 808 which, in turn, is secured within probe tip 904, e.g., with potting and adhesive (e.g., a high strength, high temperature resistant, thread locking adhesive). RTM 802 also includes a centering sleeve 910 (which may be a PEEK material) that provides a degree of thermal isolation of probe tip 904 and keeps the probe concentric to the bayonet adaptor.

Cable 808 may be a coaxial-type cable and is secured to the SHM (e.g., via connector 426 or 428 of adaptor board 410) via connector 814 which may be, for example, a connector with a threaded locking collar such as those available from Switchcraft, Inc., of Chicago, Illinois. The two wires from RTD 902 connect to the center pin and ground of cable 808.

According to a particular implementation, and as depicted in FIG. 8, mount 804 has one closed hole and one open slot which allows the fastener hardware on U-bolt 806 to remain captive to the assembly during installation. SHM mount 402 may be similarly constructed. This means that the washers and nuts do not need to be removed from the U-bolt in order to mount the SHM or RTM units onto the conduit. This is done by putting the U-bolt side of the assembly on first and then swinging the SHM or RTM unit into place. This may be helpful in that these units are often installed in difficult-to-reach and/or elevated areas where the installer would need a lift or a ladder to get to. As will be appreciated, losing a U-bolt, nut, or washer under such circumstances can be problematic. And as with SHM mount 402, the thickness of RTM mount 804 may be about 14.75 mm or less.

It will be understood by those skilled in the art that changes in the form and details of the implementations described herein may be made without departing from the scope of this disclosure. For example, the foregoing description refers to implementations that employs battery-less sensors. Despite these references, it should be understood that implementations are contemplated in which sensors employ batteries. For example, a probe tip enabled by the present disclosure can be used with a battery-powered sensor. In another example, the sensor component co-location and heat management techniques described herein may also be used with battery-powered sensors.

In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A sensor system, comprising:
   a first temperature sensor configured to generate a first sensing signal representing a first temperature of a first system component at a first location, the first temperature sensor including a temperature sensing element within a probe tip configured to engage with the first system component at the first location;
   a power source configured to convert thermal energy received from the first location to electrical energy;
   sensor circuitry configured to generate sensor data based on the first sensing signal using the electrical energy from the power source, the sensor circuitry being characterized by a thermal rating;
   one or more heat dissipation components;
   a first mounting component; and
   one or more thermal isolation components configured to thermally isolate the probe tip from the power source and from the first mounting component;
   wherein at least the first temperature sensor, the power source, the sensor circuitry, the one or more heat dissipation components, and the first mounting component are combined in a first integrated assembly configured for mounting on the first system component at the first location using the first mounting component, and wherein the first integrated assembly is constructed such that a second temperature of the sensor circuitry remains within the thermal rating over an expected range of the first temperature.

2. The sensor system of claim 1, wherein the first temperature sensor includes a thermistor, a thermocouple, or a resistance temperature detector (RTD).

3. The sensor system of claim 1, wherein the expected range of the first temperature is up to about 200 degrees Centigrade, and wherein the thermal rating of the sensor circuitry is about 80 degrees Centigrade.

4. The sensor system of claim 1, wherein the power source is a battery.

5. The sensor system of claim 4, wherein the battery is coupled to the first integrated assembly such that a temperature of the battery remains within the thermal rating over an expected range of the first temperature.

6. The sensor system of claim 1, wherein the power source is a photovoltaic harvester.

7. The sensor system of claim 6, wherein the photovoltaic harvester is coupled to the first integrated assembly such that a temperature of the photovoltaic harvester remains within the thermal rating over an expected range of the first temperature.

8. The sensor system of claim 1, wherein the power source is a thermo-electric generator (TEG).

9. The sensor system of claim 8, wherein the TEG is mounted on a surface of the first mounting component that is configured to promote heat transfer from the first system component to a first side of the TEG.

10. The sensor system of claim 9, wherein the one or more heat dissipation components include a heat sink assembly adjacent a second side of the TEG, the heat sink assembly including a plurality of radiating members extending away from the second side of the TEG.

11. The sensor system of claim 10, wherein the first integrated assembly includes a cage secured to the first mounting component and encompassing the TEG and the heat sink assembly, the cage being configured to provide mechanical protection for the TEG and the heat sink assembly, promote air flow to the heat sink assembly, and inhibit heat transfer to the sensor circuitry.

12. The sensor system of claim 11, further comprising a spring assembly secured to the cage and configured to exert force on the TEG such that the first side of the TEG is forced against the surface of the first mounting component.

13. The sensor system of claim 1, further comprising a spring configured to exert force on the probe tip toward the first system component.

14. The sensor system of claim 13, wherein the one or more thermal isolation components include a sleeve in which at least a portion of the spring resides.

15. The sensor system of claim 14, wherein the sleeve comprises a polyether ether ketone (PEEK) material.

16. The sensor system of claim 1, wherein the probe tip includes a first portion having a first width, and a second portion having a second width larger than the first width, the second portion of the probe tip having an external surface configured to engage the first system component.

17. The sensor system of claim 16, wherein the temperature sensing element is secured to an internal surface of the second portion of the probe tip, the internal surface being opposite and in thermal communication with the external surface.

18. The sensor system of claim 1, wherein the sensor system is a steam trap monitor, and wherein the first system component corresponds to a steam-side conduit connected to a steam trap.

19. The sensor system of claim 1, wherein the first mounting component comprises nickel-coated aluminum.

20. The sensor system of claim 1, further comprising a second integrated assembly configured for mounting on a second system component using a second mounting component at a second location that is different from the first location.

21. The sensor system of claim 20, further comprising a conformable, semi-rigid cable configured for connecting the second integrated assembly to the first integrated assembly.

22. The sensor system of claim 20, wherein the second integrated assembly includes a second temperature sensor configured to generate a second sensing signal representing a second temperature of the second system component, wherein the sensor circuitry is also configured to generate the sensor data based on the second sensing signal.

23. The sensor system of claim 22, wherein the second temperature sensor includes a temperature sensing element within a probe tip, the probe tip being configured for engaging with the second system component at the second location, the sensor system further comprising one or more thermal isolation components configured to thermally isolate the probe tip from the second mounting component.

24. The sensor system of claim 23, further comprising a spring configured to exert force on the probe tip toward the second system component.

25. The sensor system of claim 24, wherein the one or more thermal isolation components include a sleeve in which at least a portion of the spring resides.

26. The sensor system of claim 25, wherein the sleeve comprises a polyether ether ketone (PEEK) material.

27. The sensor system of claim 23, wherein the probe tip includes a first portion having a first width, and a second portion having a second width larger than the first width, the second portion of the probe tip having an external surface configured to engage the second system component.

28. The sensor system of claim 27, wherein the temperature sensing element is secured to an internal surface of the second portion of the probe tip, the internal surface being opposite and in thermal communication with the external surface.

29. The sensor system of claim 22, wherein the second temperature sensor includes a thermistor, a thermocouple, or a resistance temperature detector (RTD).

\* \* \* \* \*